(12) United States Patent
Tateyama et al.

(10) Patent No.: US 11,065,718 B2
(45) Date of Patent: Jul. 20, 2021

(54) LASER WELDING METHOD AND LASER WELDING APPARATUS

(71) Applicant: TOYOTA JIDOSHA KABUSHIKI KAISHA, Toyota (JP)

(72) Inventors: Nozomi Tateyama, Okazaki (JP); Hiroomi Kobayashi, Okazaki (JP); Fuminori Ohashi, Nagoya (JP); Yoshinori Shibata, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 484 days.

(21) Appl. No.: 15/982,006

(22) Filed: May 17, 2018

(65) Prior Publication Data
US 2018/0361506 A1 Dec. 20, 2018

(30) Foreign Application Priority Data

Jun. 20, 2017 (JP) .............................. JP2017-120410

(51) Int. Cl.
*B23K 26/211* (2014.01)
*B23K 26/082* (2014.01)
*B23K 26/70* (2014.01)

(52) U.S. Cl.
CPC .......... *B23K 26/211* (2015.10); *B23K 26/082* (2015.10); *B23K 26/704* (2015.10)

(58) Field of Classification Search
CPC ...... B23K 26/20; B23K 26/21; B23K 26/211; B23K 26/22; B23K 26/24; B23K 26/242; B23K 26/244; B23K 26/26; B23K 26/262; B23K 26/28; B23K 26/282; B23K 26/30; B23K 26/302; B23K 26/067; B23K 26/00; B23K 26/02; B23K 26/06; B23K 26/0673; B23K 26/0676; B23K 26/0608; B23K 26/082; B23K 26/704; B23K 26/08; B23K 26/0869
See application file for complete search history.

(56) References Cited

U.S. PATENT DOCUMENTS

2003/0217993 A1 11/2003 Stol et al.
2012/0000892 A1* 1/2012 Nowak ................. B23K 26/26
219/121.64

(Continued)

FOREIGN PATENT DOCUMENTS

CN 1129501 C 12/2003
JP 2005-527383 A 9/2005
(Continued)

*Primary Examiner* — Dana Ross
*Assistant Examiner* — Rachel R Rizzo
(74) *Attorney, Agent, or Firm* — Sughrue Mion, PLLC

(57) ABSTRACT

A laser welding method and a laser welding apparatus capable of preventing formation of blowholes and obtaining an excellent welled state are provided. An embodiment is a laser welding method for a component to be welded 40 including a third metal component 40c sandwiched between first and second metal components 40a and 40b, in which the metal components are welded to each other by scanning a laser beam in a first direction perpendicular to a direction in which the third metal component 40c is sandwiched, in which a welded part 42 is formed by applying a first laser beam 12a while scanning it in the first direction and thereby melting and then solidifying the component to be welded 40.

6 Claims, 19 Drawing Sheets

(56) References Cited

U.S. PATENT DOCUMENTS

2015/0183058 A1    7/2015  Sugiyama et al.
2016/0354867 A1   12/2016  Matsuoka et al.
2018/0117707 A1*   5/2018  Fujiwara .............. B23K 26/082

FOREIGN PATENT DOCUMENTS

| | | |
|---|---|---|
| JP | 2007-319878 A | 12/2007 |
| JP | 2010-264494 A | 11/2010 |
| JP | 2012-11465 A | 1/2012 |
| JP | 2015-217422 A | 12/2015 |
| KR | 10-2015-0016408 A | 2/2015 |
| WO | 2015/129248 A1 | 9/2015 |

* cited by examiner

LASER WELDING METHOD AND LASER WELDING APPARATUS

CROSS REFERENCE TO RELATED APPLICATIONS

This application is based upon and claims the benefit of priority from Japanese patent application No. 2017-120410, filed on Jun. 20, 2017, the disclosure of which is incorporated herein in its entirety by reference.

BACKGROUND

The present disclosure relates to a laser welding method and a laser welding apparatus. For example, the present disclosure relates to a laser welding method and a laser welding apparatus in which a foil laminate is sandwiched between two plate terminals, and the foil laminate and the plate terminals are welded together on an end face of the sandwiched foil laminate.

Japanese Unexamined Patent Application Publication No. 2015-217422 (hereinafter referred to as Patent Literature 1) discloses a laser welding method for welding a component to be welded including a laminated foil sandwiched between upper and lower charge-collecting plates in an integrated manner by using a laser beam. In the laser welding method disclosed in Patent Literature 1, a first laser beam having relatively weak power is applied from above the upper charge-collecting plate. Further, second and third laser beams having power stronger than that of the first laser beam are included on an inner side of the first laser light. The second and third laser beams are used for keyhole welding so that a molten pool spreads in a depth direction. The technique disclosed in Patent Literature 1 prevents spatters and formation of cavities (blowholes) by the above-described application of the second and third laser beams to the molten pool.

SUMMARY

The present inventors have found the following problem. In the laser welding method in which a laser beam is applied to a component to be welded, the state of a joint part may become such that pieces of a metal oxide film are segregated in an interface between a molten pool and solid metal located around the molten pool. Further, when there is moisture in the metal oxide film, blowholes may be formed. When a number of pieces of a metal oxide film are present in the metal interface of the welded part or when blowholes remain in the metal interface, problems such as deterioration in a welding strength and an increase in an electric resistance could occur.

The present disclosure has been made to solve the above-described problem and an object thereof is to provide a laser welding method and a laser welding apparatus capable of preventing blowholes from forming and obtaining an excellent joint interface.

A first exemplary aspect is a laser welding method for a component to be welded including a first metal component, a second metal component, and a third metal component sandwiched between the first and second metal components, in which the metal components of the component to be welded are welded to each other by scanning a laser beam in a first direction perpendicular to a direction in which the third metal component is sandwiched between the first and second metal components on an end face of the component to be welded and irradiating at least an end-face part of the third metal component with the laser beam, in which a welded part is formed by applying a first laser beam to the end-face part of the third metal component while scanning the first laser beam in the first direction, and thereby melting and then solidifying the component to be welded, the first laser beam having a predetermined concentrated-beam diameter on the end face, and the component to be welded is solidified and thereby welded after applying a second laser beam to an end-face part of the welded part on the end face while scanning the second laser beam in a direction other than the first direction as well as in the first direction across the end-face part of the welded part, and thereby jolting a molten pool which is formed as the welded part is melted by the application of the second laser beam, the second laser beam having a concentrated-beam diameter smaller than the concentrated-beam diameter of the first laser beam on the end face and having such output power that a depth of the molten pool from the end face becomes roughly equal to a depth of the welded part. By the above-described configuration, it is possible to prevent blowholes from forming and obtain a joint state in which pieces of a metal oxide film located near the joint interface are dispersed by the jolting of the molten pool, thus making it possible to obtain an excellent welded state.

Another exemplary aspect is a laser welding apparatus configured to scan a laser beam, for a component to be welded including a first metal component, a second metal component, and a third metal component sandwiched between the first and second metal components, in a first direction perpendicular to a direction in which the third metal component is sandwiched between the first and second metal components on an end face of the component to be welded, irradiate at least an end-face part of the third metal component with the laser beam, and thereby weld the metal components to each other, the laser welding apparatus including: a first welding head configured to apply a first laser beam to the end-face part of the third metal component, the first laser beam having a predetermined concentrated-beam diameter on the end face; a second welding head configured to apply a second laser beam to the component to be welded, the second laser beam having a concentrated-beam diameter smaller than the concentrated-beam diameter of the first laser beam on the end face; a first laser-head control unit configured to control the first welding head; and a second laser-head control unit configured to control the second welding head, in which the first laser-head control unit controls the first welding head so that a welded part is formed by applying the first laser beam to the end-face part of the third metal component while scanning the first laser beam in the first direction, and thereby melting and then solidifying the component to be welded, the second laser-head control unit controls output power of the second laser beam so that a depth of a molten pool which is formed as the welded part is melted by the application of the second laser beam from the end face becomes roughly equal to a depth of the welded part, and the second laser-head control unit controls the second welding head so that the component to be welded is solidified and thereby welded after applying the second laser beam to an end-face part of the welded part on the end face while scanning the second laser beam in a direction other than the first direction as well as in the first direction across the end-face part of the welded part, and thereby jolting the molten pool. By the above-described configuration, it is possible to obtain a joint state in which pieces of a metal oxide film located near the joint interface are dispersed by the jolting of the molten pool and thereby obtain an excellent welded state.

According to the present disclosure, it is possible to provide a laser welding method and a laser welding apparatus capable of preventing blowholes from forming and obtaining an excellent welled state.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Best modes for carrying out the present disclosure are explained hereinafter with reference to the attached drawings. However, the present disclosure is not limited to the embodiments shown below. Further, the following description and the drawings are simplified as appropriate for clarifying the explanation.

Embodiment

A laser welding method and a laser welding apparatus according to an embodiment are explained hereinafter. Firstly, a laser welding apparatus according to this embodiment is explained. After that, a laser welding method will be explained.

Laser Welding Apparatus

Figure 1:
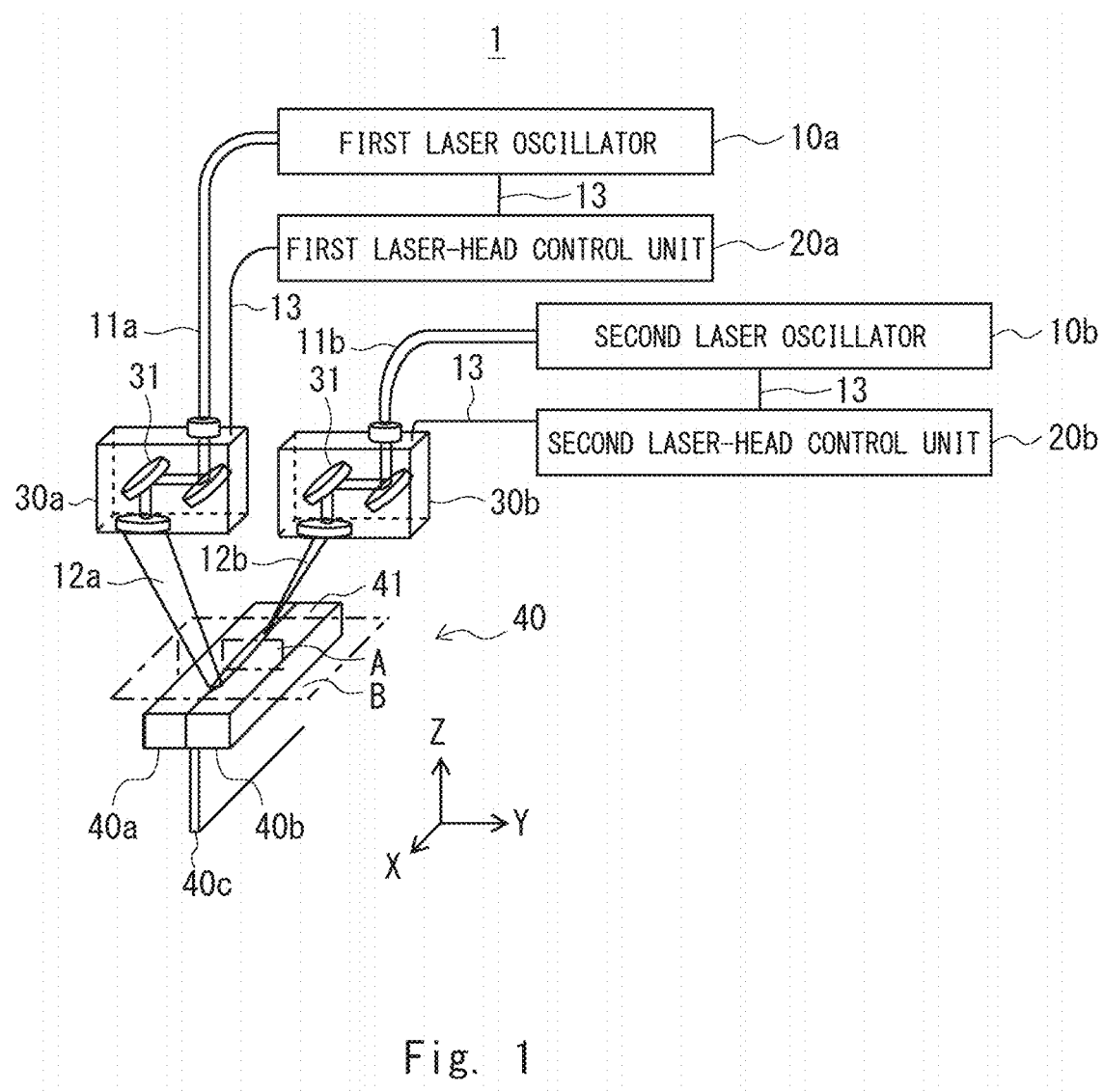
FIG. 1 is a configuration diagram showing an example of a configuration of a laser welding apparatus according to an embodiment.

Firstly, a configuration of a laser welding apparatus is explained. FIG. 1 is a configuration diagram showing an example of the configuration of the laser welding apparatus according to the embodiment.

As shown in FIG. 1, the laser welding apparatus 1 includes a first laser oscillator 10a, a second laser oscillator 10b, a first laser-head control unit 20a, a second laser-head control unit 20b, a first welding head 30a, and a second welding head 30b. The first laser oscillator 10a is connected to the first welding head 30a through a fiber cable 11a. The second laser oscillator 10b is connected to the second welding head 30b through a fiber cable 11b. The first laser oscillator 10a generates a first laser beam 12a. The second laser oscillator 10b generates a second laser beam 12b.

Note that to prevent duplicated explanations, the first and second laser oscillators 10a and 10b are collectively called laser oscillators 10 when they do not need to be distinguished from each other. When they need to be distinguished from each other, they are referred to as the first laser oscillator 10a and the second laser oscillator 10b, respectively. Similarly, the first and second laser-head control units 20a and 20b are collectively called laser-head control units 20. The first and second welding heads 30a and 30b are collectively called welding heads 30. The fiber cables 11a and 11b are collectively called fiber cables 11. The first and second laser beams 12a and 12b are collectively called laser beams 12.

The first laser oscillator 10a is connected with the first laser-head control unit 20a through a signal line 13, and the first laser-head control unit 20a is connected to the first welding head 30a through a signal line 13. Further, the second laser oscillator 10b is connected with the second laser-head control unit 20b through a signal line 13, and the second laser-head control unit 20b is connected to the second welding head 30b through a signal line 13. The laser welding apparatus 1 is an apparatus that welds a component to be welded 40 by a laser, i.e., by irradiating the component to be welded 40 with the laser beams 12. The laser oscillators 10 generate, for example, laser beams 12 having a wavelength of 1,070 nm as its center wavelength.

The first laser beam 12a generated by the first laser oscillator 10a has a predetermined concentrated-beam diameter on an end face 41 of the component to be welded 40. In order to make the first laser beam 12a have the predetermined concentrated-beam diameter, the diameter of the fiber cable 11a, for example, is adjusted to a predetermined diameter. Alternatively, the focal point of the first laser beam 12a on the optical axis is adjusted. In this embodiment, the concentrated-beam diameter of the laser beam 12 means a concentrated-beam diameter on the end face 41.

Further, the first laser beam 12a has predetermined output power. The first laser beam 12a is applied to the end face 41 of the component to be welded 40. A part of the component to be welded 40 that is irradiated with the first laser beam 12a is melted and then solidified, and becomes a welded part. The welded part of the component to be welded 40 has a predetermined depth from the end face 41. The first laser beam 12a is applied while monitoring a strength of thermal radiation light emitted from the irradiated part so that the welded part of the component to be welded 40 has the predetermined depth from the end face 41. Alternatively, a correspondence relation between depths of a welded part and oscillating conditions of the first laser beam 12a may be obtained in advance. The oscillating condition includes output power, a concentrated-beam diameter, a wavelength, etc. In this embodiment, the depth of a welded part means a depth from the end face 41.

The second laser beam 12b generated by the second laser oscillator 10b has a concentrated-beam diameter smaller than the concentrated-beam diameter of the first laser beam 12a. For example, the concentrated-beam diameter of the second laser beam 12b is made smaller than that of the first laser beam 12a by adjusting the diameter of the fiber cable IIb to a predetermined diameter. Alternatively, the focal point of the second laser beam 12b on the optical axis is adjusted.

Further, the second laser beam 12b has predetermined output power. The second laser beam 12b is applied to the welded part on the end face 41 that has been formed by the first laser beam 12a. The welded part irradiated with the second laser beam 12b melts and forms a molten pool. After the irradiation with the second laser beam 12b, the molten pool solidifies and becomes a welded part. The output power of the second laser beam 12b is adjusted so that a depth of the molten pool from the end face 41 becomes roughly equal to the depth of the welded part formed by the first laser beam 12a. The second laser beam 12b is applied while monitoring a strength of thermal radiation light emitted from the molten pool so that the depth of the molten pool from the end face 41 becomes roughly equal to the depth of the welded part formed by the first laser beam 12a. Alternatively, a correspondence relation between depths of a molten pool and oscillating conditions of the second laser beam 12b may be obtained in advance. In this embodiment, the depth of a molten pool means a depth from the end face 41.

Note that although the first and second laser oscillators 10a and 10b generate the first and second laser beams 12a and 12b, respectively, in the above explanation, the present disclosure is not limited to this example. A laser oscillator having functions of both the first and second laser oscillators 10a and 10b may generate the first and second laser beams 12a and 12b.

The fiber cables 11 guide the laser beams 12 generated by the laser oscillators 10 to the welding heads 30. The signal lines 13 are used to transmit control signals output from the laser-head control units 20 to the laser oscillators 10 and the welding heads 30. Note that the control signals may be wirelessly transmitted, instead of using the signal lines 13.

Each of the welding heads 30 includes optical components such as a galvano-mirror 31, a lens, and a mirror. The welding heads 30 apply the laser beams 12, which have been guided by the fiber cables 11, to the component to be welded 40. The welding heads 30 change places on the end face 41 where the laser beams 12 are applied by using the galvano-mirrors 31. The welding heads 30 may change the concentrated-beam diameters of the laser beams 12 by using optical components. The welding heads 30 may change output power of the laser beams 12 by using optical components such as shutters.

The first welding head 30a applies a first laser beam 12a having a predetermined concentrated-beam diameter to the component to be welded 40. The first welding head 30a applies the first laser beam 12a while scanning the first laser beam 12a in one direction on the end face 41 (i.e., making the first laser beam 12a traverse on the end face 41 in one direction). In this way, the component to be welded 40 melts and then solidifies, and thereby a welded part is formed.

The second welding head 30b applies a second laser beam 12b having a concentrated-beam diameter smaller than the concentrated-beam diameter of the first laser beam 12a to the component to be welded 40. The second welding head 30b applies the second laser beam 12b having such output power that a depth of a molten pool which is formed as the welded part is melted by the application of the second laser beam 12b becomes roughly equal to a depth of the welded part, to the component to be welded 40. The second welding head 30b applies the second laser beam 12b to an end-face part of the welded part on the end face 41 while scanning the second laser beam 12b (i.e., making the second laser beam 12b traverse) in a direction other than the one direction as well as in the one direction across the end-face part of the welded part. As a result, the molten pool is jolted and, after that, solidifies, and hence the component to be welded 40 is welded.

Note that although the first and second welding heads 30a and 30b apply the first and second laser beams 12a and 12b, respectively, to the component to be welded 40 in the above explanation, the present disclosure is not limited to this example. A welding head having functions of both the first and second welding heads 30a and 30b may apply the first and second laser beams 12a and 12b to the component to be welded 40.

The laser-head control units 20 control the laser oscillators 10 by transmitting control signals to the laser oscillators 10. The laser-head control units 20 transmit control signals to the laser oscillators 10 through the signal lines 13 and thereby control the laser oscillators 10 as to the generation, the stopping, the output power, etc. of the laser beams 12.

Note that the first and second laser-head control units 20a and 20b may control the first and second laser oscillators 10a and 10b, respectively. Alternatively, a laser-head control unit having functions of both the first and second laser-head control units 20a and 20b may control the first and second laser oscillators 10a and 10b. Further, a laser-head control unit having functions of both the first and second laser-head control units 20a and 20b may control a laser oscillator having functions of both the first and second laser oscillators 10a and 10b.

The laser-head control units 20 control the welding heads 30 by transmitting control signals to the welding heads 30. The laser-head control units 20 control the welding heads 30 as to the scanning of the laser beams 12 on the end face 41. The laser-head control units 20 may control the application, the stopping, and the output power of the laser beams 12 by using optical components, such as shutters, of the welding heads 30.

Note that the first and second laser-head control units 20a and 20b may control the first and second welding heads 30a and 30b, respectively. Alternatively, a laser-head control unit having functions of both the first and second laser-head control units 20a and 20b may control the first and second welding heads 30a and 30b. Further, a laser-head control unit having functions of both the first and second laser-head control units 20a and 20b may control a welding head having functions of both the first and second welding heads 30a and 30b.

Laser Welding Method

Figure 2:
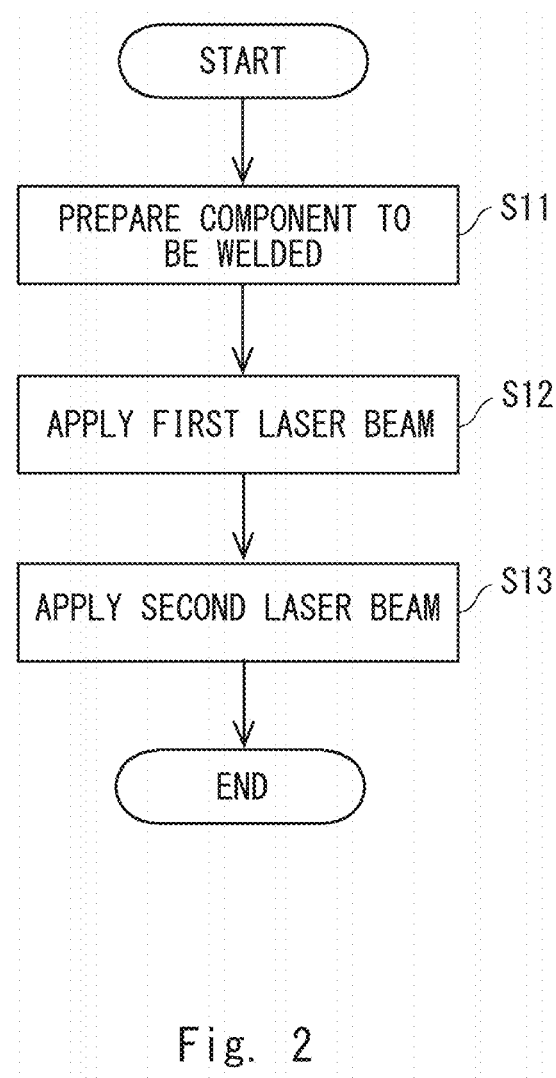
FIG. 2 is a flowchart showing an example of a configuration of a laser welding method according to an embodiment.

Next, a laser welding method is explained. In a laser welding method according to this embodiment, metal components of a component to be welded 40 are welded to each other by applying laser beams 12 to the component to be welded 40. FIG. 2 is a flowchart showing an example of the laser welding method according to this embodiment. The laser welding method is divided into a preparation of a component to be welded 40 (step S11), application of a first laser beam (step S12), and application of a second laser beam (step S13). These steps are explained hereinafter one by one.

Step S11: Preparation of Component to be Welded

Figure 3:
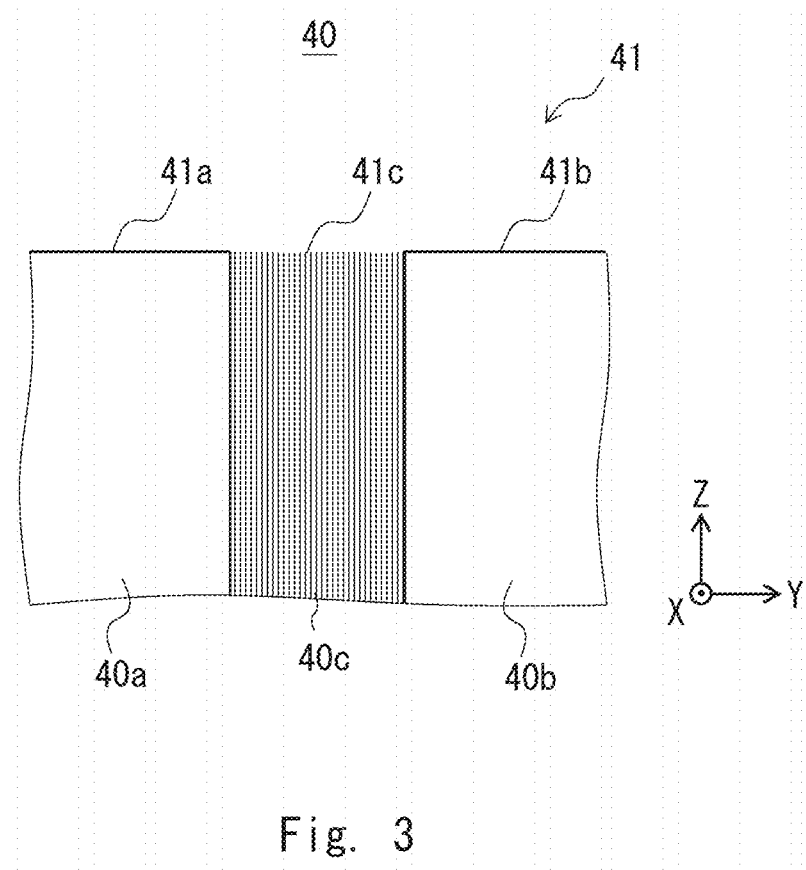
FIG. 3 shows a cross section showing an example of a component to be welded according to an embodiment, i.e., a cross section on a plane A in FIG. 1.

A preparation of a component to be welded 40 is explained. FIG. 3 shows a cross section showing an example of the component to be welded 40 according to the embodiment, i.e., a cross section on a plane A in FIG. 1.

As shown in a step S11 in FIG. 2 and in FIGS. 1 and 3, the component to be welded 40 is first prepared. The component to be welded 40 includes a first metal component 40a, a second metal component 40b, and a third metal component 40c. The third metal component 40c is sandwiched between the first and second metal components 40a and 40b.

The component to be welded 40 is, for example, an electrode component of a lithium-ion battery mounted in an EV (Electric Vehicle) or an HEV (Hybrid Electric Vehicle). The first and second metal components 40a and 40b are, for example, plate terminals. The third metal component 40c is, for example, a foil aggregation. The laser welding method according to this embodiment is a method in which components of a component to be welded 40, in which a foil aggregation is sandwiched between plate terminals, are welded to each other by T-shape butt welding. Note that the first and second metal components 40a and 40b are not limited to the plate terminals. The third metal component 40c is not limited to the foil aggregation. The component to be welded 40 is not limited to the electrode component of the lithium-ion battery.

An end face 41 is formed in the component to be welded 40. On the end face 41 of the component to be welded 40, an end-face part 41c of the third metal component 40c extends in one direction between an end-face part 41a of the first metal component 40a and an end-face part 41b of the second metal component 40b.

Here, an XYZ-orthogonal coordinate system is introduced for the sake of the explanation of the component to be welded 40. A direction perpendicular to the end face 41 of the component to be welded 40 is defined as a Z-axis direction. Two directions orthogonal to each other on a plane that is perpendicular to the Z-axis direction are defined as X- and Y-axis directions.

The first metal component 40a includes an end-face part 41a that faces in the Z-axis direction. The first metal component 40a is, for example, a square-bar-shaped plate terminal extending in the X-axis direction. Note that the shape of the first metal component 40a is not limited to the square-bar-shape, as long as it includes the end-face part 41a facing in the Z-axis direction. The second metal component 40b includes an end-face part 41b that faces in the Z-axis direction. The second metal component 40b is, for example, a square-bar-shaped plate terminal extending in the X-axis direction. Note that the shape of the second metal component 40b is not limited to the square-bar-shape, as long as it includes the end-face part 41b facing in the Z-axis direction.

The third metal component 40c includes an end-face part 41c that faces in the Z-axis direction. The third metal component 40c is, for example, a foil aggregation in which a plurality of foils are laminated on one another and aggregated in the Y-axis direction. Note that the third metal component 40c is not limited to the foil aggregation, as long as it includes the end-face part 41c facing in the Z-axis direction.

The component to be welded 40 including the first, second and third metal components 40a, 40b and 40c includes, for example, aluminum or an aluminum alloy as a component on a positive side of the lithium-ion battery. Alternatively, the component to be welded 40 includes copper or a copper alloy as a component on a negative side of the lithium-ion battery. Note that the component to be welded 40 is not limited to the component including aluminum, copper, or the like.

The first and second metal components 40a and 40b are arranged in the Y-axis direction with an interval therebetween. Further, the first and second metal components 40a and 40b sandwich the third metal component 40c therebetween. For example, they sandwich the third metal component 40c in the Y-axis direction. The end-face part 41c of the third metal component 40c extends in the X-axis direction between the end-face part 41a of the first metal component 40a and the end-face part 41b of the second metal component 40b. The component to be welded 40 in which the above-described end face 41 is formed is prepared. Then, the component to be welded 40 is disposed so that its end face 41 faces emitting ports of the welding heads 30 from which the laser beams 12 are emitted.

Step S12: Application of First Laser Beam

Figure 4:
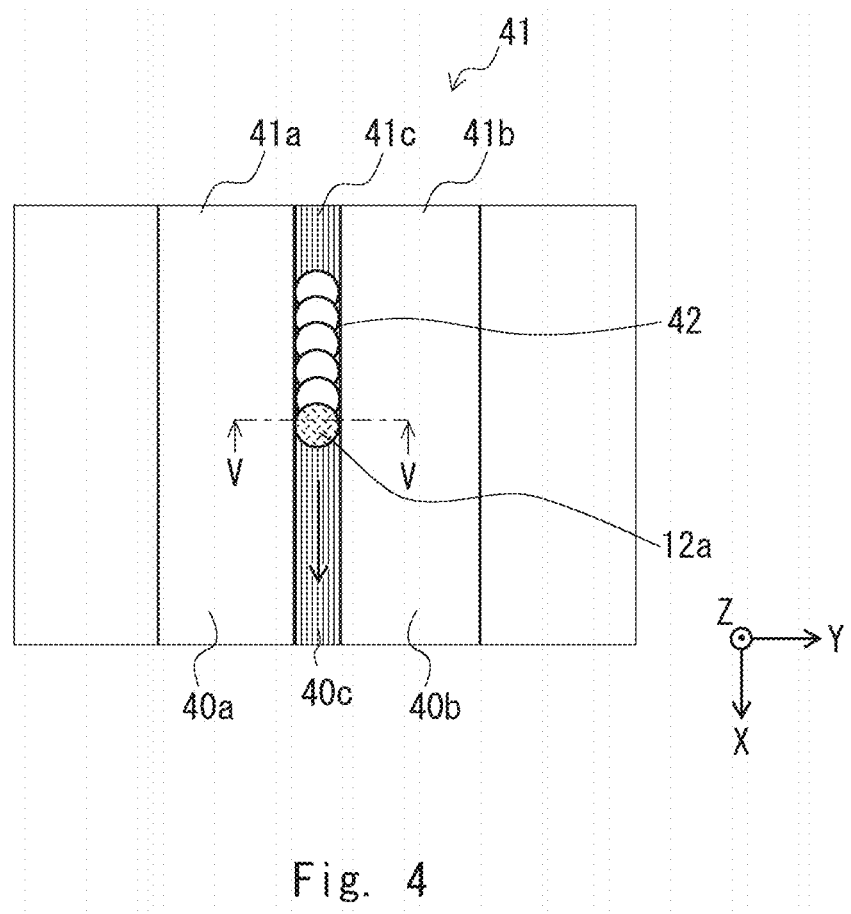
FIG. 4 shows a plan view showing an example of an end face of a component to be welded irradiated with a first laser beam according to an embodiment, i.e., a plane view on a plane B in FIG. 1.
Figure 5:
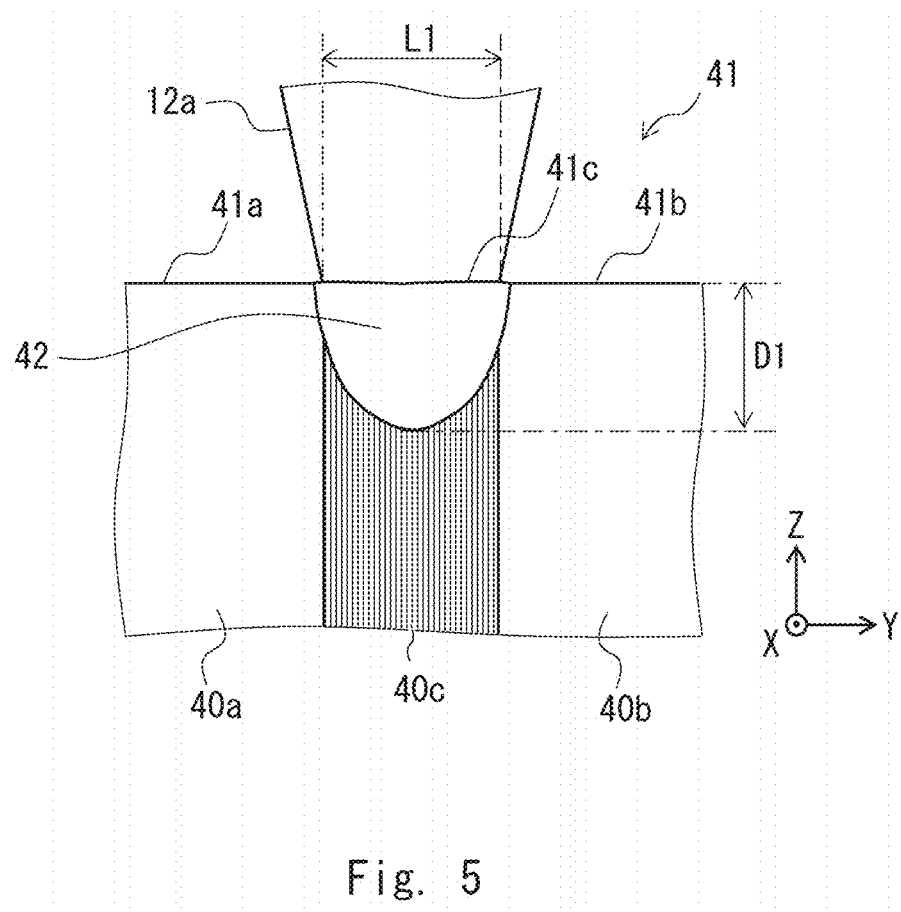
FIG. 5 shows a cross section showing an example of a component to be welded irradiated with a first laser beam according to an embodiment, i.e., a cross section taken along a line V-V in FIG. 4.

Next, application of a first laser beam 12a is explained. FIG. 4 shows a plan view showing an example of the end face 41 of the component to be welded 40 irradiated with a first laser beam 12a according to an embodiment, i.e., a plane view on a plane B in FIG. 1. FIG. 5 shows a cross section showing the example of the component to be welded 40 irradiated with the first laser beam 12a according to the embodiment, i.e., a cross section taken along a line V-V in FIG. 4.

As shown in a step S12 in FIG. 2 and in FIGS. 1, 4 and 5, the first laser beam 12a is applied. Specifically, the first laser-head control unit 20a transmits a control signal to the first laser oscillator 10a so that it generates the first laser beam 12a. Upon receiving the control signal, the first laser oscillator 10a generates the first laser beam 12a. The first laser beam 12a emitted from the first laser oscillator 10a passes through the fiber cable IIa and arrives at the first welding head 30a.

The first laser-head control unit 20a transmits a control signal to the first welding head 30a so that it applies the first laser beam 12a having a predetermined concentrated-beam diameter L1 to at least the end-face part 41c. Upon receiving the control signal, the first welding head 30a applies the first laser beam 12a having the predetermined concentrated-beam diameter L1 to the end-face part 41c of the component to be welded 40.

Note that the first laser-head control unit 20a may transmit a control signal to the first laser oscillator 10a, instead of transmitting it to the first welding head 30a. In such a case, upon receiving the control signal, the first laser oscillator 10a generates the first laser beam 12a having the predetermined concentrated-beam diameter L1.

The predetermined concentrated-beam diameter L1 of the first laser beam 12a is, for example, a diameter equivalent to 60 to 100% of the length of the third metal component 40c in the Y-axis direction as measured on the end face 41. For example, the concentrated-beam diameter L1 of the first laser beam 12a is 60 to 100% of the thickness of the foil aggregation. The first laser beam 12a is applied to the end face 41 with the concentrated-beam diameter L1, which is 60 to 100% of the length of the end-face part 41c of the third metal component 40c in the Y-axis direction.

By applying the first laser beam 12a having the concentrated-beam diameter L1 to the end face 41, the component to be welded 40 is welded by thermal conduction.

Thermal-conduction welding is the following method. That is, the first laser beam 12a is absolved in the end face 41 and thereby converted into heat. As a result, the heat is transferred from the end face 41 to the component to be welded 40 and hence the component to be welded 40 is melted. Then, the molten part is cooled and thereby solidified, and hence the component to be welded 40 is welded. For example, by adjusting the concentrated-beam diameter of the first laser beam 12a to the predetermined concentrated-beam diameter L1, the component to be welded 40 is welded by thermal conduction. As described above, the concentrated-beam diameter L1 of the first laser beam 12a on the end face 41 is the concentrated-beam diameter L1 with which the component to be welded 40 is welded by thermal conduction.

Further, the first laser-head control unit 20a transmits a control signal to the first laser oscillator 10a so that the first laser beam 12a has such output power that the component to be welded 40 is melted to a predetermined depth D1 from the end face 41. Upon receiving the control signal, the first laser oscillator 10a adjusts the output power of the first laser beam 12a so that the component to be welded 40 is melted to the predetermined depth D1.

Note that the first laser-head control unit 20a may transmit a control signal to the first welding head 30a so that the first laser beam 12a has such output power that the component to be welded 40 is melted to the predetermined depth D1 from the end face 41. In such a case, upon receiving the control signal, the first welding head 30a adjusts the output power of the first laser beam 12a so that the component to be welded 40 is melted to the predetermined depth D1.

Further, the first laser-head control unit 20a transmits a control signal to the first welding head 30a so that it applies the first laser beam 12a to the end-face part 41c of the third metal component 40c while scanning the first laser beam 12a in a first direction (i.e., making the first laser beam 12a traverse in the first direction).

The first direction is a direction perpendicular to the direction in which the third metal component 40c is sandwiched between the first and second metal components 40a and 40b on the end face 41 of the component to be welded 40. For example, the end face 41 is parallel to the XY-plane and the sandwiching direction is parallel to the Y-axis direction. Therefore, the first direction is parallel to the X-axis direction. Note that the direction perpendicular to the sandwiching direction is not limited to the direction that exactly forms an angle of 90° with respect to the sandwiching direction. That is, it may include a certain range of angles in view of the technical purpose. Further, the first direction is a direction perpendicular to the direction in which the third metal component 40c is sandwiched in the area irradiated with the laser beam. Therefore, depending on the shape of the interface between the third metal component 40c and the first and second metal components 40a and 40b, the first direction may change according to the irradiated area.

Upon receiving the control signal, the first welding head 30a applies the first laser beam 12a to the end-face part 41c of the third metal component 40c while scanning the first laser beam 12a in the first direction. For example, the first welding head 30a scans the first laser beam 12a in the first direction on the end-face part 41c of the third metal component 40c by operating the galvano-mirror 31. In this way, the component to be welded 40 is melted and then solidified, and hence a welded part 42 is formed. The first direction is, for example, a direction in which the end-face part 41c extends and is parallel to the X-axis direction. The depth of the welded part 42 becomes the depth D1.

Further, the first laser-head control unit 20a transmits a control signal to the first welding head 30a so that it applies the first laser beam 12a over the entire width of the end-face part 41c in the Y-axis direction. Upon receiving the control signal, the first welding head 30a applies the first laser beam 12a over the entire width of the end-face part 41c in the Y-axis direction. For example, when the concentrated-beam diameter L1 of the first laser beam 12a is smaller than the width of the end-face part 41c in the Y-axis direction, the first welding head 30a preferably scans the first laser beam 12a in the Y-axis direction in addition to in the first direction by performing rotation scanning or the like. When the concentrated-beam diameter L1 of the first laser beam 12a is equal to the width of the end-face part 41c in the Y-axis direction, the first welding head 30a may scan the first laser beam 12a in the X-axis direction in a straight line.

Step S13: Application of Second Laser Beam

Figure 6:
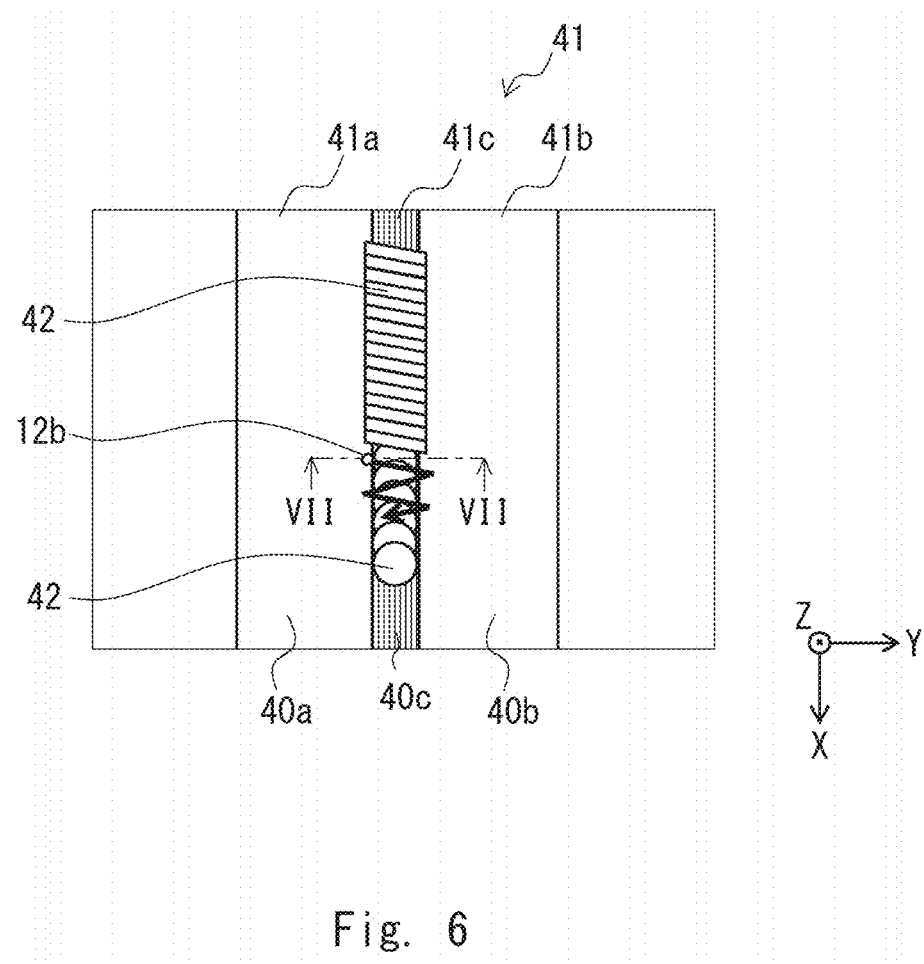
FIG. 6 shows a plan view showing an example of an end face of a component to be welded irradiated with a second laser beam according to an embodiment, i.e., a plane view on the plane B in FIG. 1.
Figure 7:
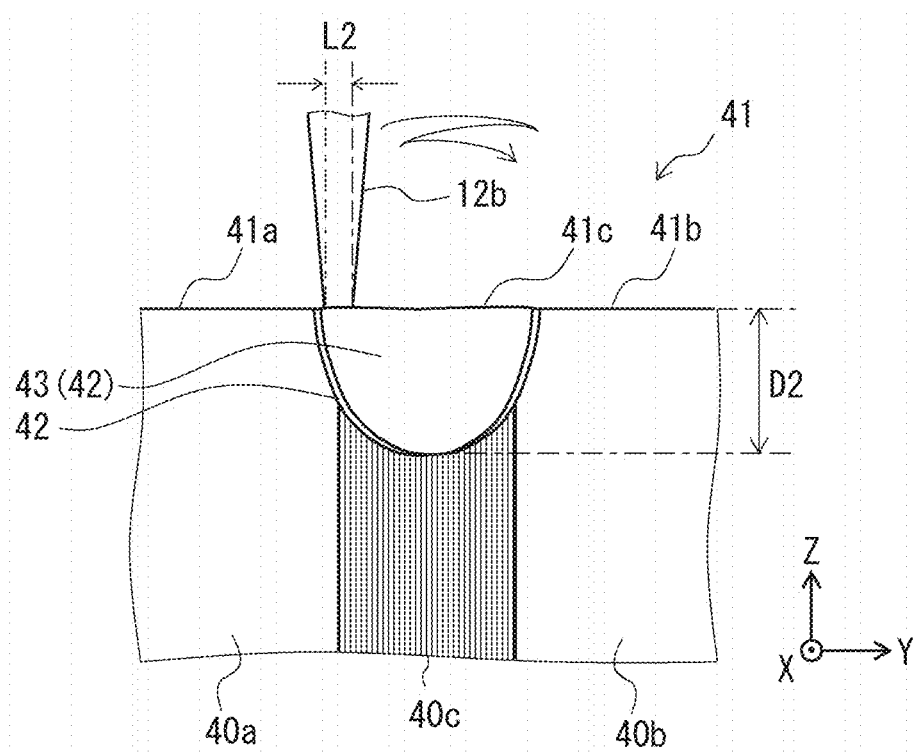
FIG. 7 shows a cross section showing an example of a component to be welded irradiated with a second laser beam according to an embodiment, i.e., a cross section taken along a line VII-VII in FIG. 6.

Next, application of a second laser beam 12b is explained. FIG. 6 shows a plan view showing an example of the end face 41 of the component to be welded 40 irradiated with a second laser beam 12b according to an embodiment, i.e., a plane view on a plane B in FIG. 1. FIG. 7 shows a cross section showing the example of the component to be welded 40 irradiated with the second laser beam 12b according to the embodiment, i.e., a cross section taken along a line VII-VII in FIG. 6.

As shown in a step S13 in FIG. 2 and in FIGS. 1, 6 and 7, the second laser beam 12b is applied. Specifically, the second laser-head control unit 20b transmits a control signal to the second laser oscillator 10b so that it generates the second laser beam 12b. Upon receiving the control signal, the second laser oscillator 10b generates the second laser beam 12b. The second laser beam 12b emitted from the second laser oscillator 10b passes through the fiber cable 11b and arrives at the second welding head 30b.

The second laser-head control unit 20b transmits a control signal to the second welding head 30b so that it applies the second laser beam 12b having a concentrated-beam diameter L2 smaller than the concentrated-beam diameter L1 of the first laser beam 12a (L2<L1) to the welded part 42. Upon receiving the control signal, the second welding head 30b applies the second laser beam 12b having the concentrated-beam diameter L2 smaller than the concentrated-beam diameter L1 of the first laser beam 12a to the welded part 42.

Note that the second laser-head control unit 20b may transmit a control signal to the second laser oscillator 10b so that it generates the second laser beam 12b having the concentrated-beam diameter L2 smaller than the concentrated-beam diameter L1 of the first laser beam 12a. In such a case, upon receiving the control signal, the second laser oscillator 10b generates the second laser beam 12b having the concentrated-beam diameter L2 smaller than the concentrated-beam diameter L1 of the first laser beam 12a.

The concentrated-beam diameter L2 of the second laser beam 12b is a diameter equivalent to 5 to 25% of the length of the third metal component 40c in the Y-axis direction on the end face 41. For example, the concentrated-beam diameter L2 of the second laser beam 12b is 5 to 25% of the thickness of the foil aggregation. Therefore, the second laser beam 12b is applied to the end face 41 with the concentrated-beam diameter L2, which is 5 to 25% of the length of the end-face part 41c in the Y-axis direction.

The welded part 42 is melted by the application of the second laser beam 12b. As a result, a molten pool 43 is formed. Keyhole welding is performed by using the second laser beam 12b having the concentrated-beam diameter L2.

The keyhole welding is a welding method in which an energy density of the second laser beam 12b is high. The keyhole welding is a welding method in which since energy is concentrated on a part in the molten pool 43 that is irradiated with the second laser beam 12b, fierce evaporation occurs and a hole is formed at the processed point by heat of the laser and an evaporation reaction force. For example, it is possible to perform keyhole welding on the component to be welded 40 by adjusting the concentrated-beam diameter of the second laser beam 12b to the predetermined concentrated-beam diameter L2. In the thermal-conduction welding state, when the concentrated-beam diameter of the laser beam 12 is gradually reduced, the welding state suddenly changes to a keyhole-welding state when the concentrated-beam diameter becomes a certain diameter. Therefore, the keyhole-welding is performed with a predetermined concentrated-beam diameter L2 that is smaller than the above-described certain concentrated-beam diameter at which the welding state changes to the keyhole-welding. As described above, the concentrated-beam diameter L2 of the second laser beam 12b on the end face 41 is the concentrated-beam diameter L2 with which the welded part 42 is keyhole-welded.

Further, the second laser-head control unit 20b transmits a control signal to the second laser oscillator 10b so that it generates the second laser beam 12b having such output power that a depth D2 of the molten pool 43, which has been formed as the welded part 42 has been melted by the application of the second laser beam 12b, becomes roughly equal to a depth D1 of the welded part 42. Upon receiving the control signal, the second laser oscillator 10b generates the second laser beam 12b having such output power that the depth D2 of the molten pool 43 becomes roughly equal to the depth D1 of the welded part 42.

Note that the second laser-head control unit 20b may transmit a control signal to the second welding head 30b so that it applies the second laser beam 12b having such output power that the depth D2 of the molten pool 43 becomes roughly equal to the depth D1 of the welded part 42. In such a case, upon receiving the control signal, the second welding head 30b applies the second laser beam 12b having such output power that the depth D2 of the molten pool 43 becomes roughly equal to the depth D1 of the welded part 42. Note that the expression "roughly equal depths" are not limited to exactly equal depths. That is, they may include errors to some extent in view of the technical purpose.

By making the depth D2 of the molten pool 43 formed by the application of the second laser beam 12b roughly equal to the depth D1 of the welded part 42, the welded part 42 can be entirely re-melted.

Further, the second laser-head control unit 20b transmits a control signal to the second welding head 30b so that it applies the second laser beam 12b to an end-face part of the welded part 42 on the end face 41 while scanning the second laser beam 12b (i.e., making the second laser beam 12b traverse) in a direction other than the first direction as well as in the first direction across the end-face part of the welded part 42. Upon receiving the control signal, the second welding head 30b applies the second laser beam 12b to the end-face part of the welded part 42 on the end face 41 while scanning the second laser beam 12b in the direction other than the first direction as well as in the first direction across the end-face part of the welded part 42.

For example, the second welding head 30b applies the second laser beam 12b while scanning it in the direction other than the first direction as well as in the first direction by performing weaving irradiation. The weaving irradiation is an irradiation method in which the second laser beam 12b is applied while scanning the second laser beam 12b in the first direction and swinging it in a second direction intersecting the first direction at the same time across the end-face part of the welded part 42. For example, the first direction is the X-axis direction and the second direction is the Y-axis direction. For example, it is an irradiation method using a scanning pattern according to which the second laser beam 12b is scanned (i.e., made to traverse) in zigzag so that it has components in the X- and Y-axis directions. The swing width in the second direction may be 1.5 to 2.5 times the length of the end-face part 41c in the Y-axis direction.

The molten pool 43 is jolted by applying the second laser beam 12b while scanning it in the direction other than the first direction as well as in the first direction as described above, and after that the molten pool 43 is solidified and hence the metal components are welded to each other.

The expression "jolting the molten pool 43" means that the molten pool 43 is moved as if it is shaken (i.e., jolted) as a result of the scanning of the second laser beam 12b or as a result of changes in the output power of the second laser beam 12b. The shaking of the molten pool 43 can be observed, for example, by using a high-speed camera. For example, in the case in which the second laser beam 12b is swung in the second direction, the molten pool 43 remains in the molten state in the irradiated part at least for a duration in which the second laser beam 12b makes one round trip in the second direction. The welding by the second laser beam 12b is the keyhole welding. It can also be interpreted that vapors formed by evaporation of the molten metal in the molten pool 43 caused by the keyhole welding move (i.e., jolt) the molten metal. Since the hole formed on the liquid surface of the molten pool 43 (i.e., the keyhole) moves, the molten pool 43 moves as if it is shaken (i.e., jolted).

In this manner, the metal components of the component to be welded 40 can be welded to each other.

Next, advantageous effects of this embodiment are explained. Advantageous effects of this embodiment are explained by comparing the embodiment with comparative examples 1 to 4. Firstly, the comparative examples 1 and 2 are explained and then advantageous effects of the above-described embodiment are explained by comparing the embodiment with the comparative examples 1 and 2.

COMPARISON WITH COMPARATIVE EXAMPLES 1 AND 2

Figure 8:
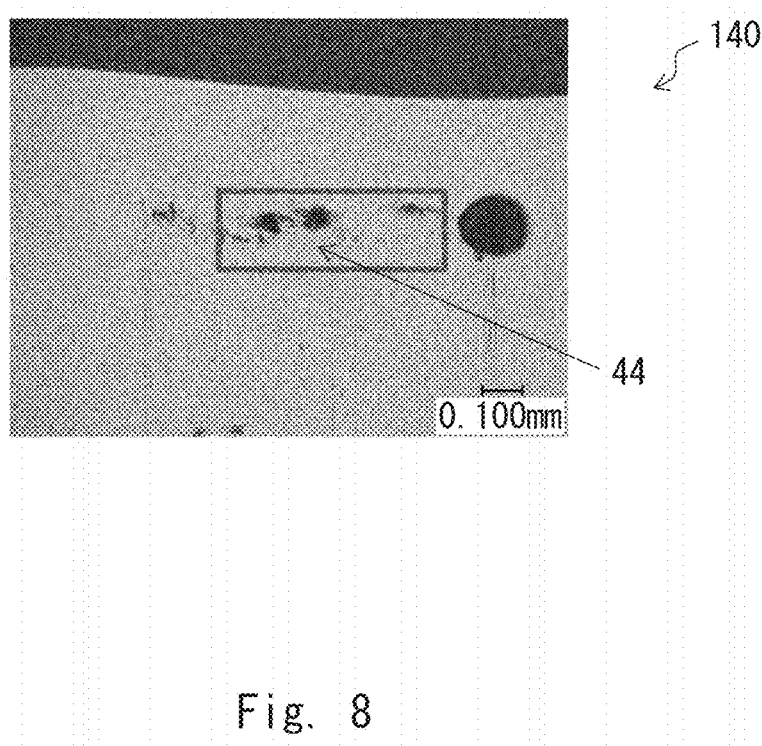
FIG. 8 is a cross section showing an example of a component to be welded that is welded by a laser welding method according to a Comparative example 1.

FIG. 8 is a cross section showing an example of a component to be welded 140 that is welded by a laser welding method according to the comparative example 1. In the comparative example 1, the concentrated-beam diameter L2 of the second laser beam 12b is adjusted to 35% of the length of the end-face part 41c of the third metal component 40c in the Y-axis direction. As shown in FIG. 8, defective fusion 44 is observed in a cross section of the component to be welded 140 according to the comparative example 1. In the comparative example 1, the concentrated-beam diameter of the second laser beam 12b is not in the range of 5 to 25%. Consequently, the welding does not become the keyhole welding and hence the molten pool 43 is not jolted. As a result, the defective fusion 44 remains.

Figure 9:
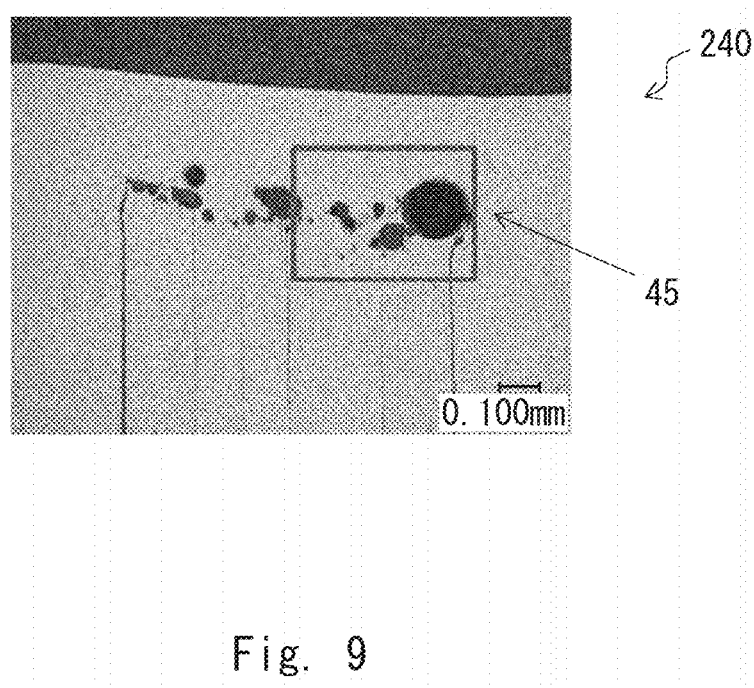
FIG. 9 is a cross section showing an example of a component to be welded that is welded by a laser welding method according to a Comparative example 2.

FIG. 9 is a cross section showing an example of a component to be welded 240 that is welded by a laser welding method according to the comparative example 2. In the comparative example 2, a depth D2 of the molten pool 43, which is formed as the welded part 42 is melted by the application of the second laser beam 12b, is smaller than a depth D1 of the welded part 42, which is welded by the application of the first laser beam 12a (D1>D2). As shown in FIG. 9, a blowhole 45 is observed in a cross section of the component to be welded 240 according to the comparative example 2. In the comparative example 2, the depth D2 of the molten pool 43 is not roughly equal to the depth D1 of the welded part 42. Consequently, the welded part 42 includes a part that is not re-melted by the second laser beam 12b. Therefore, the blowhole 45 remains.

Figure 10:
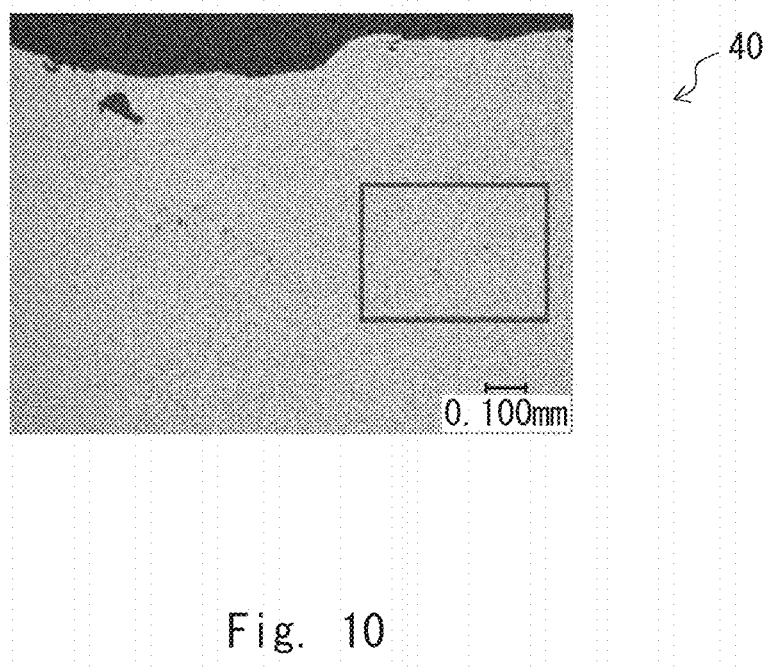
FIG. 10 is a cross section showing an example of a component to be welded that is welded by a laser welding method according to an embodiment.

FIG. 10 is a cross section showing an example of a component to be welded 40 that is welded by a laser welding method according to an embodiment of the present disclosure. As shown in FIG. 10, no defective fusion 44 is observed in a cross section of the component to be welded 40, which is welded by the laser welding method according to the embodiment of the present disclosure. Further, no blowhole 45 is observed. As shown above, in this embodiment, it is possible to prevent a blowhole 45 from forming and prevent defective fusion 44 from occurring.

Figure 11:
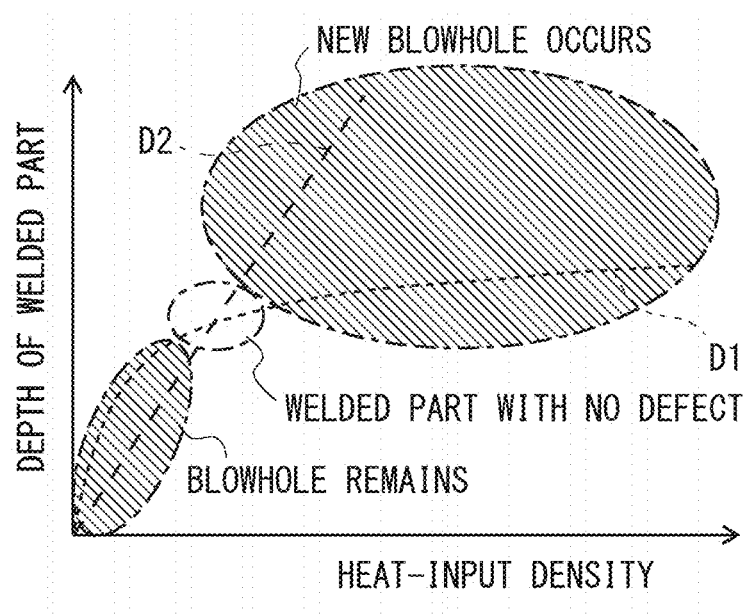
FIG. 11 is a graph showing an example of a relation between depths of a welded part formed by first and second laser beams and its welding quality, in which a horizontal axis indicates heat-input densities and a vertical axis indicates depths of the welded part.

FIG. 11 is a graph showing an example of a relation between depths of the welded part 42 formed by first and second laser beams 12a and 12b and its welding quality, in which a horizontal axis indicates heat-input densities and a vertical axis indicates depths of the welded part 42. The heat-input density means an amount of heat per unit volume fed to the welded part 42.

As shown in FIG. 11, as the heat-input density of the second laser beam 12b is increased from a value 0, the depth D2 of the welded part 42 formed by the second laser beam 12b increases at a constant rate.

Meanwhile, in a range of the first laser beam 12a from the value 0 to a predetermined value, the depth D1 of the welded part 42 formed by the first laser beam 12a is larger than the depth D2 of the welded part 42 formed by the second laser beam 12b ((Depth D1 by the first laser beam 12a)>(Depth D2 by the second laser beam 12b)). This range corresponds to the comparative example 2 shown in FIG. 9, in which the blowhole 45 remains in the welded part 42.

When the heat-input densities of the first and second laser beams 12a and 12b are predetermined values, the depth D1 of the welded part 42 formed by the first laser beam 12a is roughly equal to the depth D2 of the welded part 42 formed by the second laser beam 12b ((Depth D1 by the first laser beam 12a)=(Depth D2 by the second laser beam 12b)). This range corresponds to the embodiment shown in FIG. 10, in which no blowhole is present in the welded part 42.

When the heat-input density of the first laser beam 12a exceeds the predetermined value, the depth D1 of the welded part 42 formed by the first laser beam 12a becomes smaller than the depth D2 of the welded part 42 formed by the second laser beam 12b ((Depth D1 by the first laser beam 12a)<(Depth D2 by the second laser beam 12b)). In this case, a new blowhole 45 is formed in a part of the welded part 42 deeper than the depth D1.

Next, an example of a mechanism as to how defective fusion 44 or/and a blowhole 45 occurs and remains, observed in the comparative examples 1 and 2 is explained, and then a mechanism in a laser welding method according to the embodiment of the present disclosure is explained.

Figure 12:
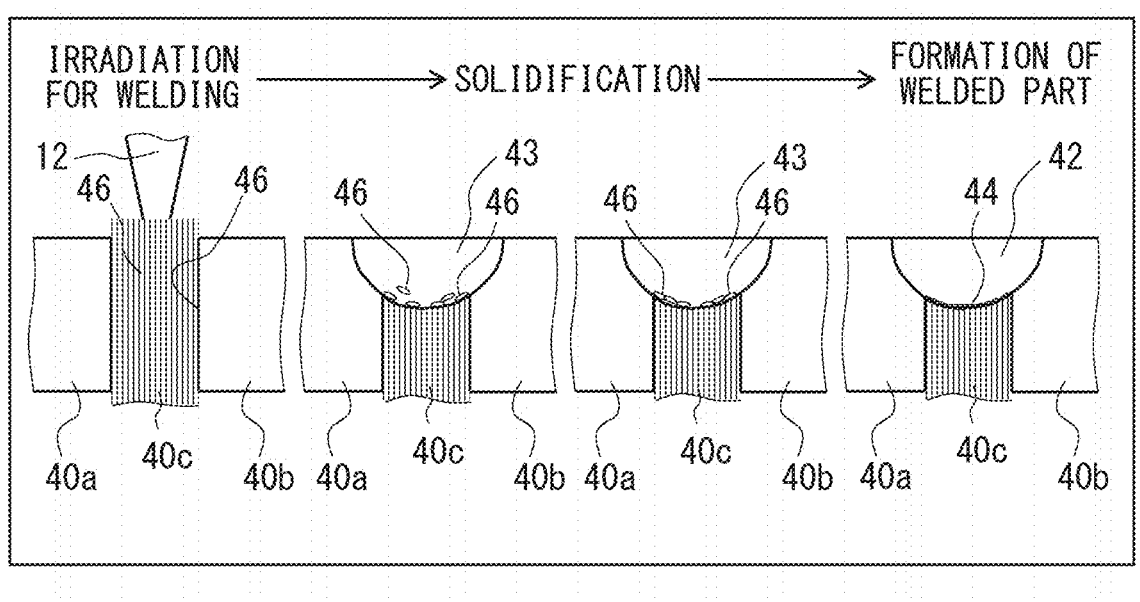
FIG. 12 shows an example of a mechanism of an occurrence of defective fusion and remaining thereof.

FIG. 12 shows an example of a mechanism as to how defective fusion 44 occurs and remains. As shown in FIG. 12, a component to be welded 40 includes a first metal component 40a, a second metal component 40b, and a third metal component 40c. The component to be welded 40 contains aluminum or copper as its material. A metal oxide film 46 is formed on a surface of aluminum or copper. When the laser beam 12 is applied to the component to be welded 40, the irradiated part melts. At this point, pieces of the metal oxide film 46 are suspended in the molten pool 43 and in the interface around the molten pool 43. Then, when the molten pool 43 solidifies, pieces of the metal oxide film 46 cling together in the interface and are segregated in the interface. Then, when the molten pool 43 solidifies and hence a welded part 42 is formed, defective fusion 44 is formed in the welded part 42 and the interface around the welded part 42. As described above, it is considered that defective fusion 44 is formed as pieces of the metal oxide film 46 are segregated in the interface of the welded part 42.

In the laser welding method according to the comparative example 1, the concentrated-beam diameter of the second laser beam 12b is not in the range of 5 to 25% of the thickness of the third metal component 40c. Consequently, the welding does not become the keyhole welding and hence the molten pool 43 cannot be moved as if it is shaken. As a result, the defective fusion 44 remains.

In contrast to this, in the embodiment of the present disclosure, the concentrated-beam diameter of the second laser beam 12b is in the range of 5 to 25% of the thickness of the third metal component 40c. Consequently, the welding becomes the keyhole welding and hence the molten pool 43 can be moved as if it is shaken. Further, the depth D2 of the molten pool 43 formed by the second laser beam 12b is roughly equal to the depth D1 of the welded part 42. As a result, the second laser beam 12b can arrive at the metal oxide film 46 remaining in the welded part 42 and the interface around the welded part 42. Therefore, it is possible to disperse the metal oxide film 46 and thereby to prevent the metal oxide film 46 from being segregated. Consequently, it is possible to prevent the defective fusion 44 from remaining.

Figure 13:
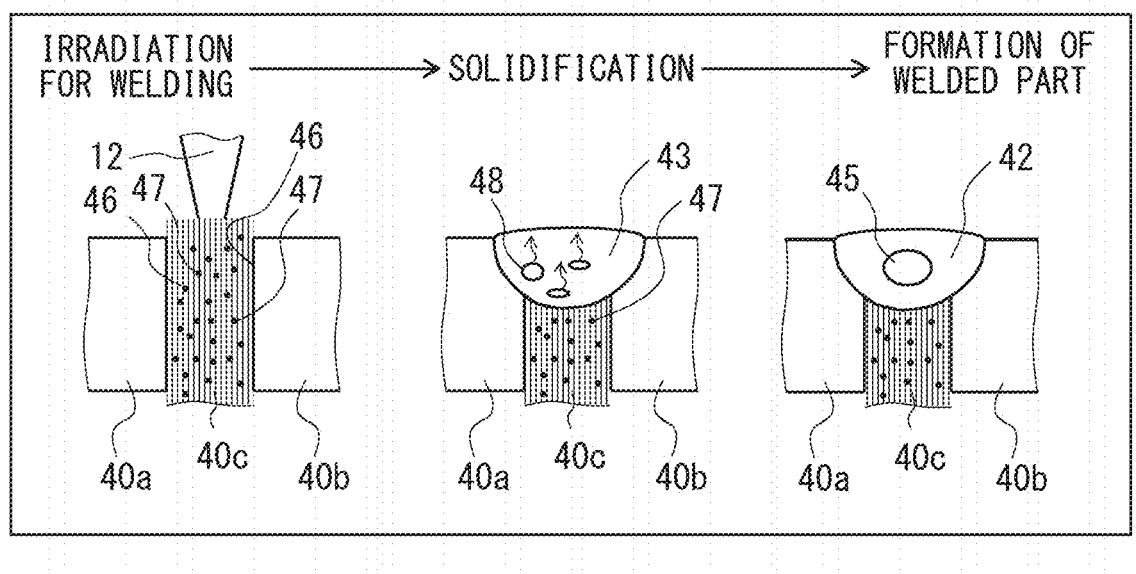
FIG. 13 shows an example of a mechanism of an occurrence of a blowhole and remaining thereof.

FIG. 13 shows an example of a mechanism as to how a blowhole is formed and remains. As shown in FIG. 13, in some cases, moisture 47, oil, etc. stick to or are absorbed in a metal oxide film 46 formed on the surfaces of the first, second and third metal components 40a, 40b and 40c. When the laser beam 12 is applied to the component to be welded 40 in which the metal oxide film 46 is formed, pores 48 are formed in the molten pool 43 due to the presence of moisture 47. The pores 48 contain, for example, hydrogen. Further, a blowhole 45 containing pores 48 therein eventually remains in the welded part 42 which is formed as the molten pool 43 solidifies.

In the laser welding method according to the comparative example 2, the depth D2 of the molten pool 43 formed by the second laser beam 12b is not roughly equal to the depth D1 of the welded part 42. As a result, the welded part 42 includes a part that is not re-melted by the second laser beam 12b. Therefore, it is impossible to prevent a blowhole 45 from remaining.

In contrast to this, in the embodiment of the present disclosure, the depth D2 of the molten pool 43 formed by the second laser beam 12b is roughly equal to the depth D1 of the welded part 42. Consequently, the welded part 42 is re-melted by the second laser beam 12b. Therefore, it is possible to prevent a blowhole 45 from remaining.

When defective fusion 44 and a blowhole 45 remain in the welded part 42, the welding strength deteriorates and the electric resistance of the welded part 42 increases. Therefore, it is impossible to improve the quality of the component to be welded. However, since the embodiment of the present disclosure can prevent the defective fusion 44 and the blowhole 45 from remaining, it is possible to obtain an excellent joint interface. Further, it is possible to improve the welding strength, prevent the change in the electric resistance of the welded part 42, and improve the quality of the component to be welded 40.

COMPARISON WITH COMPARATIVE EXAMPLE 3

Next, a comparative example 3 is explained. The comparative example 3 is first explained and then advantageous effects of the embodiment of the present disclosure are explained by comparing the embodiment with the comparative example 3.

Figure 14:
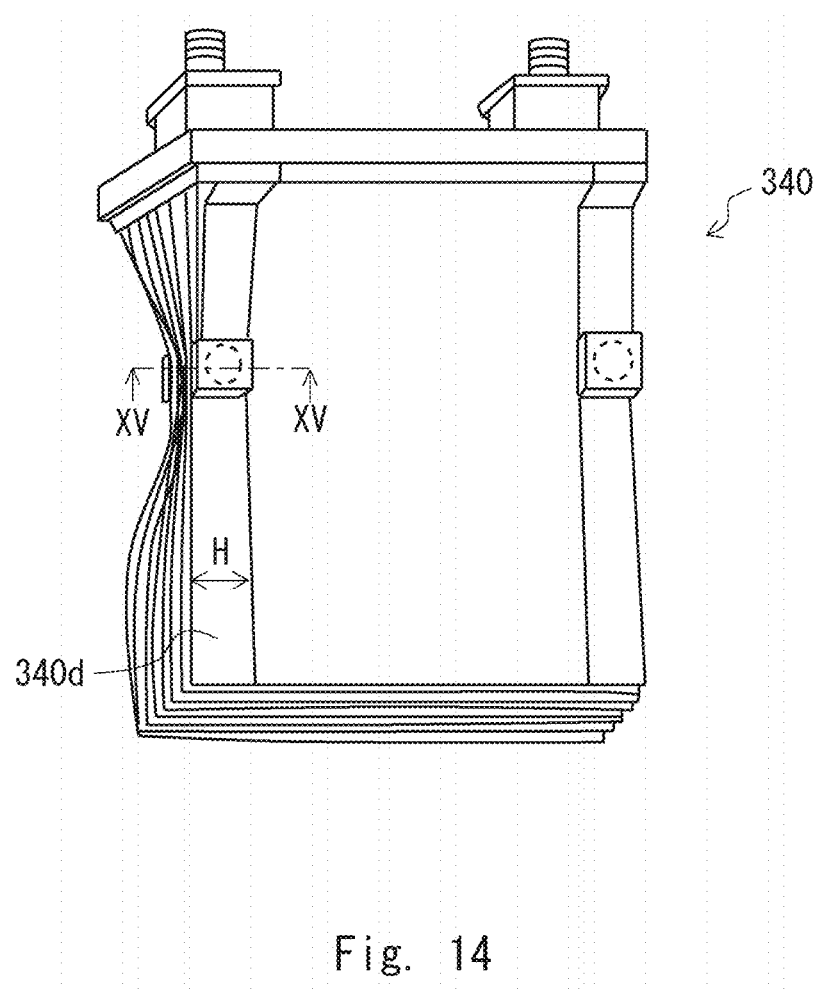
FIG. 14 shows an example of a component to be welded that is welded by a welding method according to a Comparative example 3.
Figure 15:
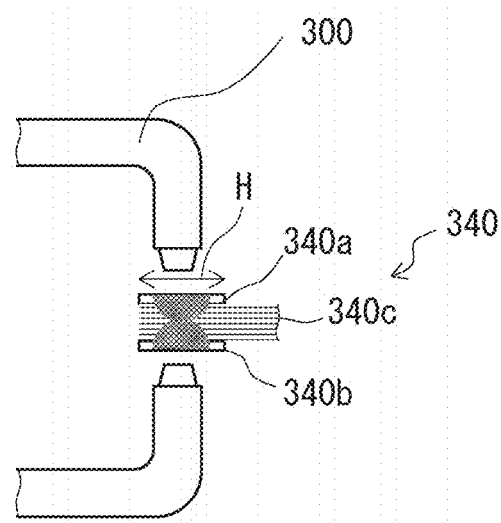
FIG. 15 is a cross section showing an example of a component to be welded that is welded by a welding method according to the comparative example 3, i.e., a cross section taken along a line XV-XV in FIG. 14.
Figure 16:
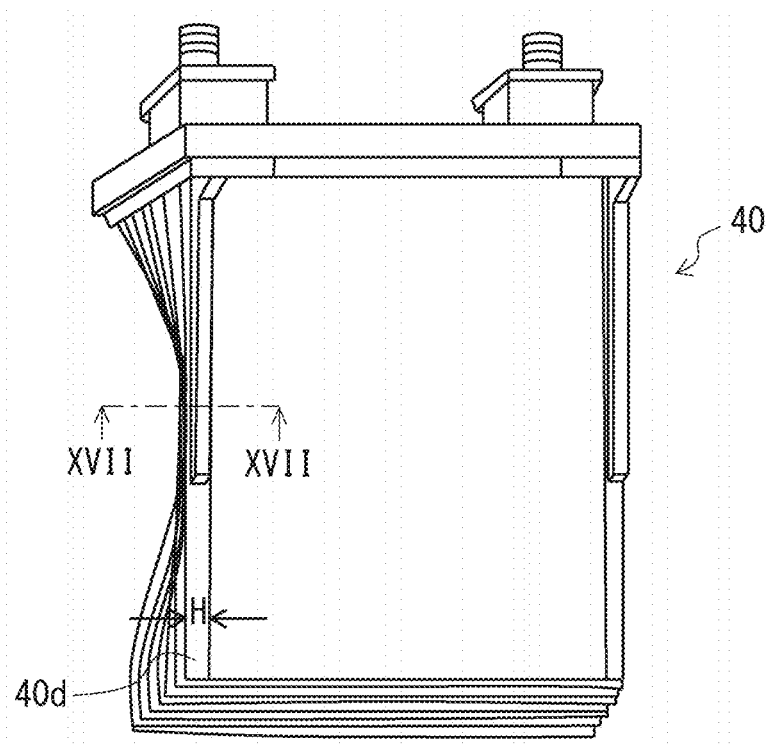
FIG. 16 shows an example of a component to be welded that is welded by a laser welding method according to an embodiment.
Figure 17:
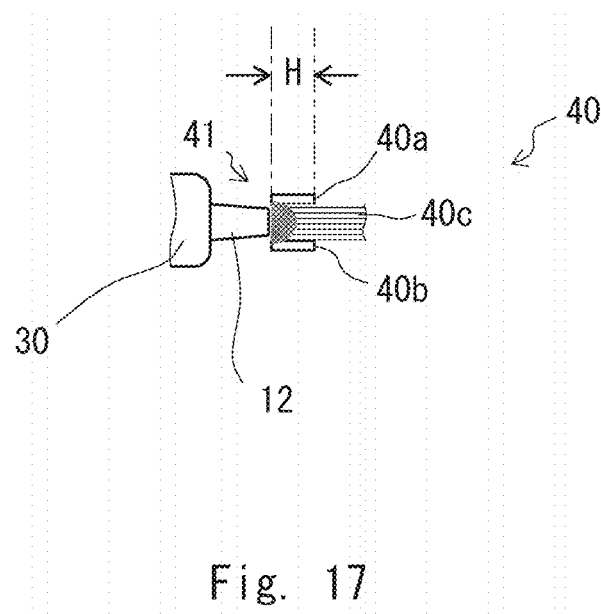
FIG. 17 is a cross section showing an example of a component to be welded that is welded by a laser welding method according to an embodiment, i.e., a cross section taken along a line XVII-XVII in FIG. 16.

FIG. 14 shows an example of a component to be welded 340 that is welded by a welding method according to a comparative example 3. FIG. 15 is a cross section showing an example of the component to be welded 340 that is welded by a welding method according to the comparative example 3, i.e., a cross section taken along a line XV-XV in FIG. 14. FIG. 16 shows an example of a component to be welded 40 that is welded by a laser welding method according to an embodiment of the present disclosure. FIG. 17 is a cross section showing an example of the component to be welded 40 that is welded by the laser welding method according to the embodiment, i.e., a cross section taken along a line XVII-XVII in FIG. 16.

As shown in FIGS. 14 and 15, the welding method according to the comparative example 3 is a welding method using a resistance or ultrasonic waves. A component to be welded 40 is sandwiched between tips of a tool 300. The sandwiched component to be welded 40 is welded by feeding an electric current across the tips of the tool 300. Alternatively, the component to be welded 40 is welded by generating ultrasonic waves across the tips of the tool 300. In the welding method according to the comparative example 3, it is necessary to sandwich the component to be welded 40 between the tips of the tool 300 and it requires an overlap width H for a joint which corresponds to the diameter of the tip of the tool 300. Therefore, the size of a non-electric-generating part 340d in a third metal component 340c is large.

In contrast to this, as shown in FIGS. 16 and 17, in the embodiment of the present disclosure, the component to be welded 40 is welded by applying the laser beam 12 to the end face 41 of the component to be welded 40. Therefore, it is unnecessary to sandwich the component to be welded 40 by the tool 300 or the like. The necessary width for the overlap width H for the joint is a width equivalent to the depth of the welded part 42 from the end face 41. Consequently, it is possible to reduce the size of the non-electric-generating part 40d in the third metal component 40c.

Further, the scanning is performed twice by using laser beams 12 having different concentrated-beam diameters. In this way, it is possible to level off variations among end faces 41 of the foils of the foil aggregation in the end-face part 41c and thereby to make the surface of the welded part 42 uniform. Therefore, it is possible to improve the welding strength and make the electric resistance uniform.

COMPARISON WITH COMPARATIVE EXAMPLE 4

Next, a comparative example 4 is explained. The comparative example 4 is first explained and then advantageous effects of the embodiment of the present disclosure are explained by comparing the embodiment with the comparative example 4.

The comparative example 4 is a laser welding method disclosed in Patent Literature 1, in which first to third laser beams are applied. Each of the second and third laser beams are located on an inner side of the first laser beam and has output power higher than that of the first laser beam. Further, the laser welding method according to the comparative example 4 includes a first melting step of forming a molten part by applying a first laser beam to a component to be welded in which first to third components are laminated from the side of the first component, a second melting step of applying a second laser beam to the molten part and thereby forming a first keyhole having a higher temperature along the second laser beam; and a third melting step of applying a third laser beam to the molten part and thereby forming a second keyhole having a higher temperature along the third laser beam. In this way, in the laser welding method according to the comparative example 4, the first to third components are melted and thereby the component to be welded is welded.

However, in the laser welding method according to the comparative example 4, it is necessary to perform welding in a depth direction while forming a molten part in each component by using the first to third laser beams. Therefore, it requires a long processing time. Further, since a part that is irradiated with the first laser beam but is not irradiated by the second and third laser beams is not re-melted, blowholes remain there. Further, no measure is taken for preventing defective fusion which is caused by segregation of a metal oxide film. Therefore, the laser welding method according to the comparative example 4 cannot prevent blowholes from forming. Further, it cannot prevent defective fusion caused by segregation of a metal oxide film.

In contrast to this, in the embodiment of the present disclosure, the welded part 42, which is welded by the first laser beam 12a, is entirely re-melted by the second laser beam 12b. Therefore, it is possible to eliminate blowholes 45, and to prevent blowholes 45 from being formed and from remaining.

Further, the second laser beam 12b having the concentrated-beam diameter L2 smaller than the concentrated-beam diameter L1 of the first laser beam 12a is applied to the molten pool 43 so that the molten pool 43 is jolted. In this way, it is possible to stir the molten pool 43 and thereby destroy a metal oxide film 46 which would otherwise cause defective fusion 44. Therefore, it is possible to obtain an excellent joint interface.

MODIFIED EXAMPLE 1 OF EMBODIMENT

Figure 18:
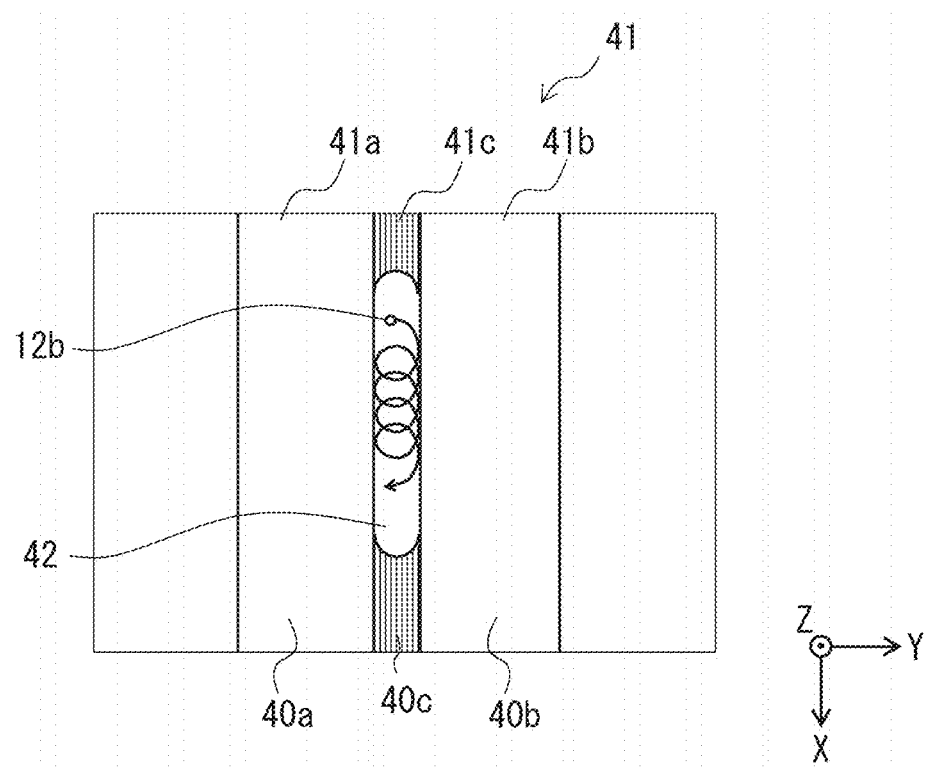
FIG. 18 is a plan view showing an example of an end face of a component to be welded irradiated with a second laser beam according to a modified example 1 of an embodiment.

Next, a modified example 1 of the embodiment is explained. FIG. 18 is a plan view showing an example of an end face 41 of a component to be welded 40 irradiated with a second laser beam 12b according to a modified example 1 of the embodiment. In the above-described embodiment, as a method for jolting the molten pool 43, the place where the second laser beam 12b is applied is moved in the first direction while swinging it in the second direction intersecting the first direction on the end face 41.

As shown in FIG. 18, in the modified example 1, the place where the second laser beam 12b is applied is wobbled (i.e., rotationally scanned). That is, the second laser beam 12b is applied while scanning it in the first direction and rotating it in a circular pattern on the end-face part of the welded part 42 at the same time. Even in this case, the molten pool 43 can be jolted. Therefore, it is possible to stir the molten pool 43 and thereby destroy a metal oxide film 46 which would otherwise cause defective fusion 44. Further, in this modified example, the laser beam 12b is scanned in every direction on a plane parallel to the end face 41, rather than being scanned only in the first and second directions. Further, the molten pool 43 is stirred so that it is whirled. In this way, it is possible to destroy the metal oxide film 46, which would otherwise be segregated in the interface, more effectively. Therefore, it is possible to prevent defective fusion 44 which would otherwise be caused by segregation of the metal oxide film 46. The modified example provides other advantageous effects similar to those of the above-described embodiment.

MODIFIED EXAMPLE 2 OF EMBODIMENT

Figure 19:
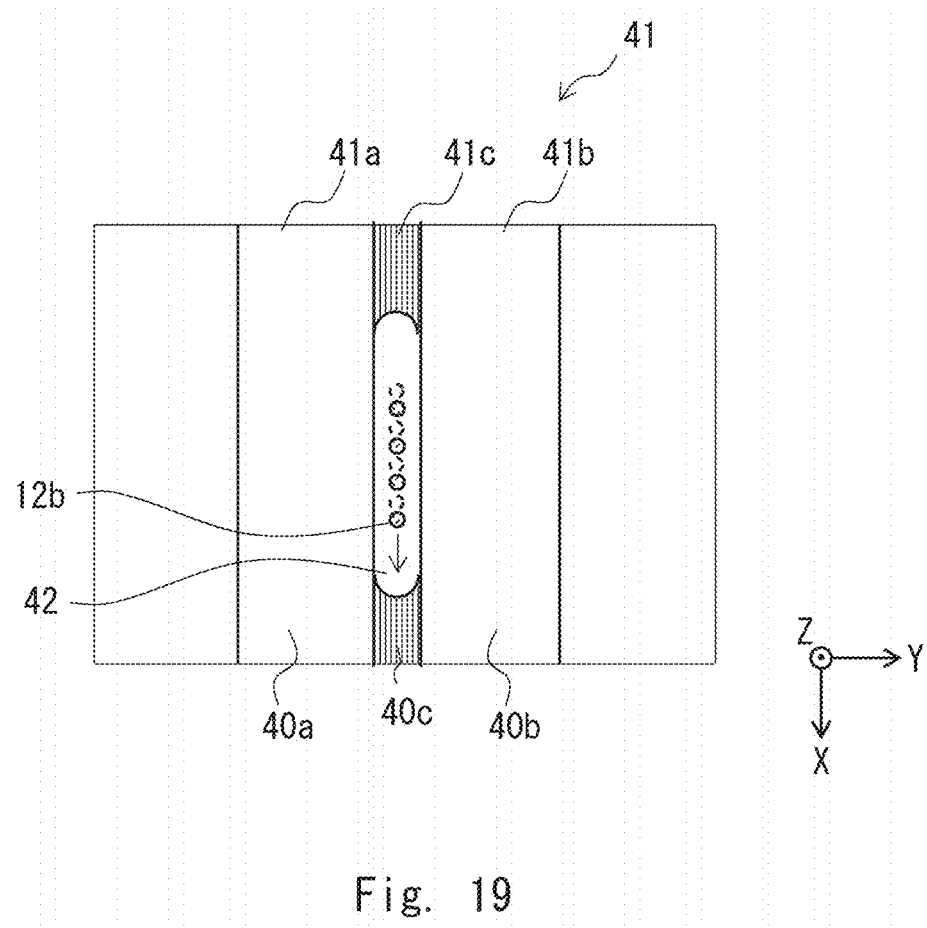
FIG. 19 is a plan view showing an example of an end face of a component to be welded irradiated with a second laser beam according to a modified example 2 of an embodiment.

Next, a modified example 2 of the embodiment is explained. FIG. 19 is a plan view showing an example of an end face 41 of a component to be welded 40 irradiated with a second laser beam 12b according to a modified example 2 of the embodiment.

As shown in FIG. 19, in the modified example 2, the second laser beam 12b has pulsed output power. That is, the second laser beam 12b is intermittently applied. In other words, the second laser beam 12b is applied while scanning it in the first direction and varying its output power in an intermittent manner at the same time. By varying the output power of the second laser beam 12b, the molten pool 43 can be jolted in the depth direction, too. Therefore, it is possible to improve the effect of destroying a metal oxide film 46 which would otherwise cause defective fusion. Note that when the concentrated-beam diameter L2 of the second laser beam 12b is smaller than the length of the welded part 42 in the Y-axis direction, the second laser beam 12b is applied while scanning it in the direction other than the first direction as well as in the first direction. The modified example provides other advantageous effects similar to those of the above-described embodiment.

Embodiments of the present disclosure have been explained above. However, the present disclosure is not limited to the above-described configurations, and they can be modified without departing from the technical idea of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A laser welding method for a component to be welded comprising a first metal component, a second metal component, and a third metal component sandwiched between the first and second metal components, in which the metal components of the component to be welded are welded to each other by scanning a laser beam in a first direction perpendicular to a direction in which the third metal component is sandwiched between the first and second metal components on an end face of the component to be welded and irradiating at least an end-face part of the third metal component with the laser beam, wherein a welded part is formed by applying a first laser beam to the end-face part of the third metal component while scanning the first laser beam in the first direction, and thereby melting and then solidifying the component to be welded, the first laser beam having a predetermined concentrated-beam diameter on the end face, the component to be welded is solidified and thereby welded after applying a second laser beam to an end-face part of the welded part on the end face while scanning the second laser beam in a direction other than the first direction as well as in the first direction across the end-face part of the welded part, and thereby jolting a molten pool which is formed as the welded part is melted by the application of the second laser beam, the second laser beam having a concentrated-beam diameter smaller than the concentrated-beam diameter of the first laser beam on the end face and having such output power that a depth of the molten pool from the end face becomes roughly equal to a depth of the welded part, the concentrated-beam diameter of the first laser beam is a diameter equivalent to 60 to 100% of a length of the third metal component in the direction in which the third metal component is sandwiched between the first and second metal components as measured on the end face, and the concentrated-beam diameter of the second laser beam is a diameter equivalent to 5 to 25% of the length of the third metal component in the direction in which the third metal component is sandwiched between the first and second metal components on the end face.

2. The laser welding method according to claim 1, wherein the molten pool is jolted by applying the second laser beam to the end-face part of the welded part while scanning the second laser beam in the first direction and swinging it in a second direction at the same time across the end-face part of the welded part, the second direction intersecting the first direction.

3. The laser welding method according to claim 1, wherein the molten pool is jolted by applying the second laser beam to the end-face part of the welded part while scanning the second laser beam in the first direction and rotating it in a circular pattern on the end-face part of the welded part at the same time.

4. The laser welding method according to claim 1, wherein the molten pool is jolted by applying the second laser beam while scanning the second laser beam in the first direction and varying its output power in an intermittent manner at the same time.

5. The laser welding method according to claim 1, wherein the concentrated-beam diameter of the first laser beam on the end face is the concentrated-beam diameter with which the component to be welded is welded by thermal conduction, and the concentrated-beam diameter of the second laser beam on the end face is the concentrated-beam diameter with which the welded part is keyhole-welded.

6. A laser welding apparatus configured to scan a laser beam, for a component to be welded including a first metal component, a second metal component, and a third metal component sandwiched between the first and second metal components, in a first direction perpendicular to a direction in which the third metal component is sandwiched between the first and second metal components on an end face of the component to be welded, irradiate at least an end-face part of the third metal component with the laser beam, and thereby weld the metal components to each other, the laser welding apparatus comprising:
a first welding head configured to apply a first laser beam to the end-face part of the third metal component, the first laser beam having a predetermined concentrated-beam diameter on the end face;
a second welding head configured to apply a second laser beam to the component to be welded, the second laser beam having a concentrated-beam diameter smaller than the concentrated-beam diameter of the first laser beam on the end face;
a first laser-head control unit configured to control the first welding head; and
a second laser-head control unit configured to control the second welding head, wherein
the first laser-head control unit controls the first welding head so that a welded part is formed by applying the first laser beam to the end-face part of the third metal component while scanning the first laser beam in the first direction, and thereby melting and then solidifying the component to be welded,
the second laser-head control unit controls output power of the second laser beam so that a depth of a molten pool which is formed as the welded part is melted by the application of the second laser beam from the end face becomes roughly equal to a depth of the welded part,
the second laser-head control unit controls the second welding head so that the component to be welded is solidified and thereby welded after applying the second laser beam to an end-face part of the welded part on the end face while scanning the second laser beam in a direction other than the first direction as well as in the first direction across the end-face part of the welded part, and thereby jolting the molten pool,
the concentrated-beam diameter of the first laser beam is a diameter equivalent to 60 to 100% of a length of the third metal component in the direction in which the third metal component is sandwiched between the first and second metal components as measured on the end face, and
the concentrated-beam diameter of the second laser beam is a diameter equivalent to 5 to 25% of the length of the third metal component in the direction in which the third metal component is sandwiched between the first and second metal components on the end face.

* * * * *